3,200,072
EXTREME PRESSURE LUBRICANT CONTAINING ALKYD RESINS DERIVED FROM COMPLEX ACIDS
Louis A. Joo and John B. Braunwarth, Crystal Lake, Ill., assignors to The Pure Oil Company, Chicago, Ill., a corporation of Ohio
No Drawing. Filed Dec. 26, 1961, Ser. No. 162,204
8 Claims. (Cl. 252—37.2)

This invention relates to new and useful improvements in extreme-pressure lubricant compositions. More particularly, this invention relates to lubricating-oil compositions which are useful under extreme-pressure conditions, such as those encountered in transmissions and differentials in cars and trucks, and other high-pressure-type gears.

In the lubrication of gear elements in automotive vehicles and various industrial machines, lubricants are generally used which are fortified with additives in order to augment the natural ability of the lubricants to provide lubricity at high pressures and/or temperatures. One such product which has been successfully used is a sulfurized-phosphorized fatty oil (or other fatty material), prepared in accordance with a method disclosed in Whittier et al., U.S. Patent 2,211,306. Sulfurized-phosphorized fatty materials prepared by other similar procedures are also commercially known. In general, the sulfurized-phosphorized extreme-pressure additives which are used commercially are those derived from fatty oils such as lard oil or sperm oil. In Stucker U.S. Reissue Patent 22,911 extreme-pressure lubricant compositions are disclosed which contain both a sulfurized-phosphorized fatty material as an extreme-pressure additive and an aryl polysulfide, such as dibenzyl disulfide, to further enhance the extreme-pressure and wear-resisting properties of the oil. Compositions of the type described in the Stucker reissue patent are widely used as gear lubricants for many extreme-pressure applications.

As noted above, sulfurized-phosphorized fatty oils prepared by a variety of techniques are commercially available. Sulfurized-phosphorized fatty oils have been produced by sulfurizing a fatty oil with sulfur or a sulfur halide, or similar sulfur-containing compound, for a considerable length of time, usually until the mixture is shown to be substantially non-corrosive, and then phosphorizing the product with a phosphorus sulfide until the mixture is again rendered non-corrosive. Other prior art methods employ the sulfurization-phosphorization in a single step through the use of a phosphorus sulfide under suitable reaction conditions. Air-blowing and other techniques, such as cooking under nitrogen or other inert gas, have been resorted to for the purpose of increasing the yield of extreme-pressure agents, and to enhance the beneficial characteristics of the additives.

The nature of the environment in which hypoid and other gears function is such that it is advisable to have a lubricant present, which serves both to cool and lubricate the gears, to prevent or inhibit welding effects during normal operations, and also to afford such protection under more severe conditions of operation, the extremes of which range from thick-film to boundary lubrication. Not only is increased oiliness over that normally furnished by unfortified mineral lubricating oils necessary in order to reduce friction in that zone of lubrication referred to as semi-boundary lubrication, where there is a transition from thick-film lubrication requiring only mineral oil to boundary lubrication requiring anti-weld protection, but the extreme-pressure oil must be able to withstand heavy loads, high temperatures, and high pressures without undergoing degradation, breakdown, or polymerization to insoluble products or other compounds of decreased lubricity and cooling properties. Moreover, the extreme-pressure lubricant must have a high film strength at operating conditions so that it uniformly and tenaciously clings to the surface to be protected.

An ideal extreme-pressure lubricant should therefore have good lubricity, good cooling properties, high film strength, good load-bearing ability, good resistance to the effects of high pressures and/or temperatures, good low-temperature fluidity, and miscibility with the usual types of base oils. Moreover, it should be preferably inexpensive, simple to prepare, and it should be capable of operating efficiently under a variety of conditions so that it may, for example, be used in both heavy industrial and vehicular engines of low speed and high torque and also in the lighter high speed-low torque machines such as passenger vehicles. Extreme-pressure additives have tended to be somewhat expensive and have increased the price of gear oils considerably over the price of ordinary unfortified lubricating oils.

Accordingly, it is an object of this invention to provide an extreme-pressure lubricant composition having enhanced extreme-pressure properties while utilizing inexpensive extreme-pressure additives.

Another object of this invention is to provide an improved extreme-pressure lubricant composition in which a part of a more expensive, sulfurized, extreme-pressure additive is replaced with a less expensive ingredient.

A feature of this invention is the provision of an improved extreme-pressure lubricant composition comprising a mineral lubricating oil, a sulfurized-phosphorized extreme-pressure additive, a small amount of an oil-soluble alkyd resin, and a small amount of a naphthenate salt of a polyvalent metal.

Another feature of this invention is the provision of an improved extreme-pressure lubricant composition comprising a mineral lubricating oil containing about 2–20% wt. of a sulfurized-phosphorized fatty oil, 0.3–3.0% wt. of an oil-soluble alkyd resin, and a naphthenate salt of a polyvalent metal, such as cobalt, iron, copper, zinc, lead, manganese, chromium, calcium, or zirconium, in a metal concentration in the range of about 0.0001 to 0.0010% wt.

Other objects and features of this invention will become apparent from time to time throughout the specification and claims as hereinafter related.

This invention is based upon our discovery that a highly satisfactory extreme-pressure lubricant can be prepared using a mineral lubricating oil and a sulfurized-phosphorized fatty, extreme-pressure lubricant additive together with a small amount of an oil-soluble alkyd resin and a naphthenate salt of a polyvalent metal. In this composition, the small amount of oil-soluble resin and naphthenate salt have replaced the dibenzyl disulfide which is normally used in extreme-pressure lubricant compositions of this type, and thus results in a composition which is substantially less expensive and which has improved extreme-pressure properties. While the relative proportions of all of the ingredients of this lubricating composition are not especially critical, it is preferred to use a composition consisting of about 2–20% wt. of a sulfurized-phosphorized fatty material (such as lard oil or sperm oil), 0.3–3.0% wt. of an oil-soluble alkyd resin, and a naphthenate salt of a polyvalent metal in a metal concentration of 0.0001–0.0010% wt., the remainder of the composition consisting of a mineral lubricating oil. The type of oil used in this composition is not especially critical and is selected according to the viscosity requirements of the finished product. Thus, distilled oils, solvent extracted oils, and blended oils of all types can be used as the lubricant base for this composition as long as the mixture of oils has the desired viscosity characteristics. The metal naphthenate salt used in this composition is preferably a polyvalent metal of the group consisting of cobalt, iron, copper, zinc, lead, manganese, chromium, calcium and zirconium. The naphthenate salt must be used in a metal concentration in the range from about 0.001 to 0.0010% wt. Concentrations below the minimum specified are ineffective for the desired purpose, and concentrations above the maximum specified tend to promote excessive wear on parts lubricated by the lubricant composition.

The extreme-pressure additive used in this lubricant composition is preferably a sulfurized-phosphorized fatty material prepared in accordance with Whittier Patent 2,254,357, Stucker Reissue Patent 22,911, or Chapman et al. Patent 2,910,438. In the preparation of the extreme-pressure lubricant, a fatty material, such as a fatty ester (e.g., sperm oil, lard oil, soy bean oil, coconut oil, cottonseed oil, rape seed oil, wool grease) or synthetic fatty esters such as metal oleate, etc., is chemically reacted with sulfur or a sulfur-containing reagent by heating to an elevated temperature for several hours. The fatty material is preferably sulfurized to a sulfur content of about 5–10% wt. by heating the mixture to about 300°–350° F. for a period of several hours. The sulfurized material so obtained is then reacted with a small proportion, preferably about 0.2–2% wt. of a phosphorus sulfide, preferably phosphorus sesquisulfide, at a temperature of about 220°–250° F. for several hours. Usually, the sulfurization and phosphorization steps are carried out until the product is relatively non-corrosive as measured by the copper-strip corrosion test. In certain applications it may be desirable to carry out the sulfurization and phosphorization steps for shorter periods of time to leave the sulfur and phosphorus in a chemically bound but slightly active form.

The resin which is used in this lubricant composition may be any suitable oil-soluble alkyd resin. However, the resin which is used is preferably one which is prepared in accordance with Kramer and Joo patent application, Ser. No. 55,123, filed September 12, 1960 (now United States Patent 3,129,192), made from dibasic acids prepared by the metalation of aromatic solvent extract oils obtained in the solvent refining of lubricating oils. In view of the comprehensive description of the process of preparation of alkyd resins and the properties of those resins in the aforementioned Kramer and Joo patent, a complete description of the resins and their preparation is not given herein. The specification of the Kramer and Joo patent should therefore be considered as part of this specification for any of the details of the process of resin preparation, or of the properties of the resins. Any of the oil-soluble resins prepared in accordance with that patent can be used in the lubricant composition of this invention. The preparation of these resins is summarized as follows:

In the refining of crude petroleum, desalted crude oil is discharged to a distillation unit where straight-run gasoline, two grades of naphtha, kerosine, and virgin distillate are taken off, leaving a reduced crude residue. The reduced crude is continuously charged to a vacuum-distillation unit where three lubricating-oil distillates are taken off as side-streams, a light distillate is taken off overhead, and a residuum is withdrawn from the bottom of the tower. The residuum is charged to a propane-deasphalting unit where the propane dissolves the desirable lubricating oil constituents and leaves the asphaltic materials. The deasphalted oil and various lubricating distillates from the reduced crude are then subjected to solvent extraction for the separation of non-aromatic constituents prior to use. The refined oil or raffinate from the extraction processes is used per se, or as blending stock, for lubricating oils, and the solvent extract, predominating in complex polycyclic aromatic constituents, is used as the base material for the preparation of mixtures of polybasic acids for the preparation of alkyd resins usable in accordance with this invention. For example, a crude oil from an East Texas field, with an API gravity of 33.1, was topped to remove such light fractions as gasoline, naphtha, kerosine, and a light lubricating distillate. The vacuum residuum was recovered as a reduced crude having a viscosity of 1251 SUS at 210° F., 2.2% sulfur, and an API gravity of 12.6. After propane deasphalting, the oil had a viscosity of 174 SUS at 210° F., and an API gravity of 24.7. This deasphalted oil was then treated with phenol to produce a raffinate from which an aviation lubricating oil could be prepared. The oil extracted by phenol treatment, after removal of phenol, is ready for use as the starting material for preparation of the alkyd resins to be used in accordance with this invention. In the solvent-refining step, solvents other than phenol can be used to obtain the extraction product, for example, liquid sulfur dioxide, nitrobenzene, dichlorodiethylether, chlorophenol, trichloroethylene, cresylic acids, pyridine, furfural, or a mixture of liquid propane and cresol. When using phenol, it is possible to vary the characteristics of the extract and raffinate products considerably by adjustment of the amount of water mixed with the solvent.

The starting solvent-extract material is first reacted with an alkali metal dispersed in an active solvent. While any of the alkali metals can be used in this reaction, either singly or in the form of mixtures or alloys, it is preferred to use sodium, potassium, or the liquid sodium-potassium alloys. About 30 parts of solvent extract oil are used per 1–5 parts of alkali metal. The reaction may be carried at temperatures from as low as −60° C. to as high as 80° C. The solvents which are used for this type of reaction are preferably ethers, such as dioxane, tetrahydrofuran, dialkyl ethers of ethylene glycol, polyethylene glycols and higher glycols, preferably the dimethyl ethers of glycols, dimethylether, and methylalkyl ethers, and tertiary aliphatic amines such as trimethylamine. This reaction is described more completely in the aforementioned Kramer and Joo patent, and also in Martinek patent application, Serial No. 819,932 (now abandoned). When the reaction with alkali metal is complete as evidenced by its dissolution, the reaction mixture is treated with carbon dioxide. The temperature of the carbonation is not critical and may be the same or a different temperature as that used during the reaction with the alkali metal. The reaction mixture is next washed with water and allowed to separate into a solvent phase and a water phase. Countercurrent washing may be used if desired. The resulting water phase, consisting of sodium salts of extract polybasic acids, is acidified with a strong acid such as hydrohalic acid, sulfuric acid or phosphoric acid. This causes the polybasic, polynuclear, aromatic acids to separate or precipitate from the aqueous mixture. The polybasic acids which are thus prepared have an average molecular weight of about 300–1000, a sulfur content of 2.0–4.5% wt., and an average of about 1.7 to 3.5 aromatic rings per means aromatic molecule.

The mono-, di- and polybasic polynuclear aromatic acids prepared above are condensed with polyhydric alcohols, e.g., glycerol, glycols or polyglycols, pentaerythritol, etc., to form alkyd resins.

The alkyd resins are defined in said application as the alkyd resin reaction product under esterification conditions of (1) A carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkyl-aromatic and heterocyclic nuclei predominating in carbon and hydrogen, containing about 2.0 to 4.5% by weight of combined sulfur and also containing oxygen and nitrogen, having a average molecular weight of about 320 to 600, and having about 1.7 to 3.5 average number of aromatic rings per means aromatic molecule, and (2) A polyol having from 3 to 20 carbon atoms to the molecule and 3 to 7 hydroxyl groups to the molecule.

These alkyd resins are also prepared by using a modified fatty acid with the polyol and the carboxylic acids derived from solvent extracts. This fatty acid may be a saturated fatty acid having 6 to 24 carbon atoms per molecule or an unsaturated fatty acid having 12 to 26 carbon atoms per molecule. A specific example of unsaturated fatty acid comprises dehydrated castor oil acid. The properties of the resins can be altered as desired by varying the types and proportions of reactants, or by incorporating unsaturated fatty acids as modifiers. The incorporation of unsaturated fatty acids in the alkyd resins results in preferred resin compositions for use in accordance with this invention.

The following non-limiting examples are illustrative of the scope of this invention.

EXAMPLE I

A base oil was prepared by mixing approximately 50 parts per weight of 160 vis., 90 VI bright stock, 38.5 parts per weight of 170 vis., 100 VI neutral oil, and 9.98 parts per weight of extreme-pressure base (sulfurized-phosphorized sperm oil). The extreme-pressure base was prepared by heating a 45° sperm oil (151 vis. at 200° F.) with flowers of sulfur for 4 hours at 300°–330° F. The sulfurized mixture was then cooled, phosphorus sesquisulfide was added, and the mixture heated for 8 hours at 220°–230° F. The final sulfurized-phosphorized sperm oil composition contained 8.9% wt. sulfur and 0.67% wt. phosphorus. An alkyd resin was prepared in accordance with the aforementioned Kramer and Joo patent by heating together 150 g. of petroleum extract acid (having an acid number of 204 as measured by ASTM Method (1948)), 36 g. of glycerol, and 133 g. of dehydrated castor oil acids. The resin which was formed by this reaction was oil-soluble, and was mixed with various oil compositions as subsequently described herein.

The base oil, consisting of mineral lubricating oil and EP base, was divided into several portions and various additives (alkyd resin and/or cobalt naphthenate or dibenzyl disulfide) were added to each, with stirring and mild heating (to 150° F.). Then each sample was tested by means of the Shell four-ball test apparatus to determine the effect of the additive on the extreme-pressure wear-resisting properties of the composition. The results of these measurements for several different lubricant compositions are set forth in Table I. In each case, the alkyd resin is the specific resin described above and the cobalt naphthenate was added in the form of a 6% solution (6% wt. cobalt concentration) and mineral oil. In the table, the concentration of the additives is expressed in percent wt. except for the cobalt naphthenate which is expressed as percent wt. of cobalt.

Table I

| Sample No. | Additive (percent wt.) | Wear-Scar Diam. (av. of 3 tests) 20 kg., 5 min. mm.×10⁻³ | Weld Point, kg. |
| --- | --- | --- | --- |
| A | None | 300 | 230–240 |
| B | 1% dibenzyl disulfide | 295 | 250–260 |
| C | 1% alkyd resin | 298 | 240–250 |
| D | 2% alkyd resin | 302 | 240–250 |
| E | 0.0006% cobalt | 302 | 250–260 |

EXAMPLE II

In another series of experiments, a base oil was prepared consisting of lubricating oil plus EP base having the same composition as in Example I. This base oil was divided into several portions and various additives were added with stirring and mild heating (150° F.) as in Example I. The several portions were then separately tested by means of the Shell four-ball testing apparatus to determine the effect of the additives on extreme-pressure and wear-resisting properties of the lubricant. In this series of experiments, the effect of the combined use of cobalt naphthenate and the alkyd resin additive was evaluated. The results of these experiments are set forth in Table II.

Table II

| Sample No. | Additive (percent wt.) | Wear-Scar Diam. (av. of 3 tests) 20 kg., 5 min. mm.×10⁻³ | Weld Point, kg. |
| --- | --- | --- | --- |
| F | 1% alkyd resin, 0.0006% cobalt | 296 | 250–260 |
| G | 1% alkyd resin, 0.0012% cobalt | 405 | 510–520 |
| H | 1.5% alkyd resin, 0.0008% cobalt | 297 | 250–260 |
| I | 3.0% alkyd resin, 0.0008% cobalt | 295 | 250–260 |

From these experiments, we have found that the alkyd resin and cobalt naphthenate are individually only moderately effective in improving the extreme-pressure or wear-resisting properties of the EP lubricating oil base. In fact, the use of an excessive amount of cobalt naphthenate results in an increase in wear, although there is a substantial increase in the extreme-pressure properties of the lubricant. We have found that the combination of a small amount of alkyd resin, in the range of about 0.3–3.0% wt., and cobalt naphthenate (or other polyvalent metal naphthenates), in a metal concentration of about 0.0001 to 0.0010% wt., is effective in improving the wear-resisting and extreme-pressure properties of a lubricant base to about the same extent as is accomplished by the addition of 1% wt. dibenzyl disulfide to the same lubricant base. The small amount of alkyd resin and the very minute amount of cobalt naphthenate have been found to be considerably less expensive than dibenzyl disulfide and thus may be used effectively in producing a less-expensive extreme-pressure lubricant.

While we have described our invention with special emphasis upon certain preferred embodiments, we wish it to be understood that within the scope of the claims the invention may be practiced otherwise than as specifically described herein. For example, while alkyd resins which are prepared from extract acids obtained by metalation of polynuclear aromatic solvent extracts are preferred, it is possible to use other oil-soluble alkyd resins. Similarly, while cobalt naphthenate is a preferred additive in accordance with this invention, other polyvalent metal naphthenates such as iron naphthenate, copper naphthenate, zinc naphthenate, lead naphthenate, manganese naphthenate, chromium naphthenate, calcium naphthenate, and zirconium naphthenate can be substituted, using the same metal concentration. The extreme-pressure base which is added to the lubricating oil is not a critical feature of this invention since other extreme-pressure additives which are well known in the art could be substituted therefor. In general, the lubricant composition which is prepared in accordance with this invention will contain an extreme-pressure additive which consists of a fatty material (preferably a fat or fatty oil) which has been sulfurized by heating with elemental sulfur, or other sulfur-yielding material for a time sufficient to cause the sulfur to become chemically bound in the fatty oil, followed by reaction of the sulfurized fatty material with a phosphorus sulfide, preferably phosphorus sesquisulfide, at an elevated temperature for a time sufficient for the phosphorus and sulfur to become chemically bound in the product. While the invention has been described with reference to sulfurized-phosphorized sperm oil as the extreme-pressure additive, it will be obvious to those skilled in the art that other sulfurized-phosphorized fatty oils may be used, such as lard oil, cottonseed oil, soy bean oil, fish oils of various types, etc.

The embodiments of the invention in which an exclusive property or privilege is claimed are defined as follows:

1. An extreme pressure lubricant composition consisting essentially of
    (a) a major portion of a mineral lubricating oil,
    (b) a minor portion of a sulfurized-phosphorized fatty material sufficient to enhance the extreme pressure property of said oil,
    (c) a naphthenate salt of a polyvalent metal of the group consisting of cobalt, iron, copper, zinc, lead, manganese, chromium, calcium and zirconium in a metal concentration of about 0.0001 to 0.0010 percent by weight, and
    (d) about 1 to 2 percent by weight of an oil soluble alkyd resin reaction product prepared under esterification conditions of
        (1) a carboxylic acid prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkylaromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule, and
        (2) a polyol having from 3 to 20 carbon atoms to the molecule and 3 to 7 hydroxyl groups to the molecule.

2. An extreme pressure lubricant composition in accordance with claim 1 in which said sulfurized-phosphorized fatty material is sulfurized-phosphorized sperm oil and said polyol is glycerol.

3. An extreme pressure lubricant composition consisting essentially of
    (a) a base oil comprising about 50 parts by weight of refined mineral lubricating oil,
    (b) about 9.98 parts by weight of a sulfurized-phosphorized sperm oil and, based on said parts,
    (c) cobalt naphthenate in a cobalt concentration of about 0.0001 to 0.0010% by wt., and
    (d) about 1% by wt. of an alkyd resin prepared by heating together about 150 g. of mixed complex carboxylic acids prepared from phenol extracts obtained in the phenol refining of mineral lubricating oils by reaction of said phenol extracts with sodium to form the sodium adduct, carbonation of said adduct to form the corresponding sodium salt of a carboxylic acid and acidification of said salt to form the free acids, said acids being characterized by having an acid number of about 204,
        (1) about 36 g. of glycerol, and
        (2) about 133 g. of dehydrated castor oil acids.

4. An extreme pressure lubricant composition consisting essentially of
    (a) a base oil comprising about 50 parts by weight of refined mineral lubricating oil,
    (b) about 9.98 parts by weight of a sulfurized-phosphorized sperm oil, and, based on said parts,
    (c) cobalt naphthenate in a cobalt concentration of about 0.0001 to 0.0010% by wt. and
    (d) about 2% by wt. of an alkyd resin prepared by heating together about 150 g. of mixed complex carboxylic acids prepared from phenol extracts obtained in the phenol refining of mineral lubricating oils by reaction of said phenol extracts with sodium to form sodium adduct, carbonation of said adduct to form the corresponding sodium salt of a carboxylic acid and acidification of said salt to form the free acids, said acids being characterized by having an acid number of about 204,
        (1) about 36 g. of glycerol, and
        (2) about 133 g. of dehydrated castor oil acids.

5. An extreme pressure lubricant composition consisting essentially of
    (a) a major portion of a mineral lubricating oil,
    (b) about 2.0 to 20% by wt. of sulfurized-phosphorized fatty material sufficient to enhance the extreme pressure properties of said oil,
    (c) a naphthenate salt of a polyvalent metal of the group consisting of cobalt, iron, copper, zinc, lead, manganese, chromium, calcium and zirconium in a metal concentration of about 0.0001 to 0.0010 percent by weight and
    (d) about 0.3 to about 3.0 percent by weight of an oil soluble alkyd resin reaction product prepared under esterification conditions of
        (1) mixed mono-, di- and polycarboxylic acids prepared from solvent extracts obtained in the solvent refining of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being thus characterized by having complex, polynuclear, aromatic, alkylaromatic and heterocyclic nuclei predominating in carbon and hydrogen, containing about 2.0 to 4.5% by weight of combined sulfur and also containing oxygen and nitrogen, having an average molecular weight of about 320 to 600, and having about 1.7 to 3.5 average number of aromatic rings per mean aromatic molecule,
        (2) a polyol having 3 to 20 carbon atoms to the molecule and 3 to 7 hydroxyl groups to the molecule, and
        (3) an unsaturated fatty acid having 12 to 26 carbon atoms per molecule.

6. An extreme pressure lubricant composition in accordance with claim 5 in which said polyol is glycerol and said unsaturated fatty acid is dehydrated castor oil acids.

7. An extreme pressure lubricant in accordance with claim 5 in which said naphthenate salt is cobalt naphthenate.

8. An extreme pressure lubricant consisting essentially of
    (a) about 50 parts of 160 vis., 90 VI bright stock, and 38.5 parts of 170 vis., 100 VI neutral as the mineral lubricating oil,
    (b) about 9.98 parts of sulfurized-phosphorized sperm oil containing about 8.9% by wt. of sulfur and about 0.67% by weight of phosphorus,
    (c) about 1.0 to 3.0% by weight, based on said parts, of an alkyd resin prepared by heating together about 150 g. of mixed complex carboxylic acids prepared from phenol extracts obtained in the phenol refining of mineral lubricating oils by reaction of said phenol extracts with sodium to form the sodium adduct, carbonation of said adduct to form the corresponding sodium salt of a carboxylic acid and acidification of said salt to form the free acids, said acids being characterized by having an acid number of about 204,
        (1) about 36 g. of glycerol, and
        (2) about 133 g. of dehydrated castor oil acids, and (d) cobalt naphthenate in a cobalt concentration of about 0.0006 to 0.0008 wt. percent.

References Cited by the Examiner

UNITED STATES PATENTS

| | | | |
|---|---|---|---|
| 2,136,391 | 11/38 | Miller | 252—37.2 X |
| 2,455,337 | 11/48 | Jones | 252—57 X |
| 2,910,438 | 10/59 | Chapman et al. | 252—46.6 |
| 2,968,619 | 1/61 | Manteuffel et al. | 252—46.6 |
| 2,970,164 | 1/61 | Jezl | 260—75 X |

DANIEL E. WYMAN, *Primary Examiner.*

JULIUS GREENWALD, *Examiner.*